United States Patent
Tanaka

(10) Patent No.: US 10,141,962 B2
(45) Date of Patent: Nov. 27, 2018

(54) DEMODULATOR

(71) Applicant: Asahi Kasei Microdevices Corporation, Tokyo (JP)

(72) Inventor: Narutomo Tanaka, Tokyo (JP)

(73) Assignee: Asahi Kasei Microdevices Corporation, Tokyo (JP)

( * ) Notice: Subject to any disclaimer, the term of this patent is extended or adjusted under 35 U.S.C. 154(b) by 0 days.

(21) Appl. No.: 15/791,425

(22) Filed: Oct. 24, 2017

(65) Prior Publication Data

US 2018/0062679 A1    Mar. 1, 2018

Related U.S. Application Data

(63) Continuation of application No. PCT/JP2016/074412, filed on Aug. 22, 2016.

(30) Foreign Application Priority Data

Aug. 31, 2015 (JP) .................. 2015-170911

(51) Int. Cl.
*H04B 1/10* (2006.01)
*H04B 1/16* (2006.01)
*H04L 27/148* (2006.01)
*H04L 27/06* (2006.01)

(52) U.S. Cl.
CPC .............. *H04B 1/10* (2013.01); *H04B 1/16* (2013.01); *H04L 27/06* (2013.01); *H04L 27/148* (2013.01)

(58) Field of Classification Search
CPC ............ H04B 1/10; H04B 1/16; H04L 27/148
See application file for complete search history.

(56) References Cited

U.S. PATENT DOCUMENTS

| | | | | | |
|---|---|---|---|---|---|
| 3,979,679 | A | * | 9/1976 | Bush ...................... | H03D 3/001 455/213 |
| 4,416,024 | A | * | 11/1983 | Ugari .................. | H03G 3/3052 381/10 |
| 4,480,335 | A | * | 10/1984 | Kishi ...................... | H04B 1/10 381/13 |
| 4,648,126 | A | * | 3/1987 | Toffolo .................. | H03G 3/345 455/212 |

(Continued)

FOREIGN PATENT DOCUMENTS

JP    2006050018 A    2/2006

OTHER PUBLICATIONS

International Search Report for International Patent Application No. PCT/JP2016/074412, issued by the Japan Patent Office dated Oct. 11, 2016.

(Continued)

*Primary Examiner* — Freshteh N Aghdam

(57) ABSTRACT

A demodulator includes: a demodulation section that outputs a demodulated signal demodulated from a modulated signal; an integration section 60a that integrates the demodulated signal; a zone detection section 60b that detects a replacement target zone in the demodulated signal based on an integrated signal output by the integration section; and a replacement section 60c that replaces a signal of the replacement target zone in the demodulated signal with a replacement target signal. A noise can be removed by integrating the demodulated signal by the integration section, and detecting a replacement target zone in the demodulated signal by the zone detection section based on the integrated signal.

11 Claims, 7 Drawing Sheets

(56) References Cited

U.S. PATENT DOCUMENTS

| | | | | |
|---|---|---|---|---|
| 4,648,127 | A * | 3/1987 | Jongepier | H03G 3/345 |
| | | | | 455/212 |
| 5,630,217 | A * | 5/1997 | Matsumoto | H03G 3/345 |
| | | | | 455/222 |
| 6,122,332 | A | 9/2000 | Ogata et al. | |
| 6,295,324 | B1 * | 9/2001 | Whikehart | H04B 1/1661 |
| | | | | 375/308 |
| 8,050,646 | B2 * | 11/2011 | Gozen | H03G 3/345 |
| | | | | 379/406.05 |
| 2001/0016475 | A1 * | 8/2001 | Tsujishita | H03G 3/345 |
| | | | | 455/222 |
| 2005/0143109 | A1 * | 6/2005 | Ohashi | G10L 21/0208 |
| | | | | 455/501 |
| 2009/0305653 | A1 | 12/2009 | Ojima et al. | |
| 2013/0272365 | A1 | 10/2013 | Aizawa | |

OTHER PUBLICATIONS

Office Action issued for counterpart Japanese Application 2017-537757, issued by the Japan Patent Office dated May 22, 2018.
International Preliminary Report on Patentability for International Application No. PCT/JP2016/074412, issued by the International Bureau of WIPO dated Mar. 6, 2018.

\* cited by examiner

DEMODULATOR

The contents of the following Japanese patent application are incorporated herein by reference:
NO. 2015-170911 filed on Aug. 31, 2015.
NO. PCT/JP2016/074412 filed on Aug. 22, 2016.

BACKGROUND

1. Technical Field

The present invention relates to a demodulator.

2. Related Art

One of modulation schemes for modulating a signal such as an audio signal to a radio wave is frequency modulation (FM modulation) for changing a frequency of a carrier wave in accordance with amplitude of a signal wave. A signal that is FM modulated (FM signal) is demodulated in a demodulator in the following steps: converting an FM signal into I/Q signals which are orthogonal to each other, for example, by an arc-tangent wave detection method; obtaining an angle (i.e., an arc-tangent value) $\theta = \tan^{-1}(Q/I)$ formed by the I/Q signals; and calculating a time differential value thereof (simply referred to as a differential value) $\Delta\theta (= d\theta/dt)$.

In this arc-tangent wave detection method, it is known that a pulse noise (also referred to as a weak electric field noise) is generated when an electric field is weak. Therefore, in demodulating a weak electric field signal, it is necessary to remove a pulse noise. Such a pulse noise can be removed by passing a weak electric field signal through a low-pass filter (for example, refer to Patent Document 1).
Patent Document 1: Japanese Patent Application Publication No. 2009-296307

However, when a weak electric field signal is passed through a low-pass filter, not only a pulse noise, but also a signal component of a high frequency band is removed, which may result in degradation of a demodulated signal. Thus, it may be desired to use a noise blanker which removes a pulse noise from a weak electric field signal. A demodulator using a noise blanker removes a weak electric field noise, for example, in the following steps: among values of demodulated signals sampled at a constant interval, comparing a current value with a previously sampled value; and when a large difference is found, determining that a weak electric field noise is generated and replacing the demodulated signal with a blank signal.

However, an arc-tangent value detected in the arc-tangent wave detection is defined to fall within a range of $2\pi$ from $-\pi$ to $+\pi$, for example. It is assumed that differential values of arc-tangent values are correspondingly normalized to fall within a range of $2\pi$ from $-\pi$ to $+\pi$. For example, when a value of $+1.1\pi$ is obtained by differentiating detected arc-tangent values, the differential value is to be normalized to $-0.9\pi$. Accordingly, normalization of the differential values of the arc-tangent values in this manner may result in erroneous demodulation such as misdetection of a pulse noise.

SUMMARY (Item 1)
A demodulator may include a demodulation section that outputs a demodulated signal demodulated from a modulated signal. The demodulator may include an integration section that integrates the demodulated signal. The demodulator may include a zone detection section that detects a replacement target zone in the demodulated signal based on an integrated signal output by the integration section. The demodulator may include a replacement section that replaces a signal of the replacement target zone in the demodulated signal with a replacement target signal.

(Item 2)
The integration section may include a high-pass filter and integrate the demodulated signal passing through the high-pass filter.

(Item 3)
The integration section may include an absolute value calculation section that calculates an absolute value of a signal integrated from the demodulated signal.

(Item 4)
The demodulator may further include a decimation filter that reduces a data rate of the demodulated signal passing through the replacement section.

(Item 5)
The zone detection section may include a comparison section that detects a noise zone of the demodulated signal based on a comparison result of the integrated signal with respect to a reference value.

The zone detection section may include a determination section that stretches the noise zone and determines the replacement target zone.

(Item 6)
The replacement section may include a low-pass filter to which the demodulated signal is input and that outputs the replacement target signal.

(Item 7)
The demodulation section may include an orthogonal demodulator that demodulates, from the modulated signal that is FM modulated, an I signal and a Q signal orthogonal to each other.

The demodulation section may include an FM demodulator that outputs the demodulated signal obtained by differentiating an arc-tangent of the I signal and the Q signal.

(Item 8)
The FM demodulator may output the demodulated signal obtained by correcting a differential value of the arc-tangent of the I signal and the Q signal to fall within a predetermined numerical range.

(Item 9)
The replacement target zone may be a zone in which a pulse noise at least exists, the pulse noise generated due to normalization of a differential value of an arc-tangent value.

The summary clause does not necessarily describe all necessary features of the embodiments of the present invention. The present invention may also be a sub-combination of the features described above.

DESCRIPTION OF EXEMPLARY EMBODIMENTS

Hereinafter, the present invention is described through the embodiments of the invention. However, the following embodiments are not to limit the claimed invention. Also, all of combinations of features described in the embodiments are not necessarily required for the solution of the invention.

Figure 1:
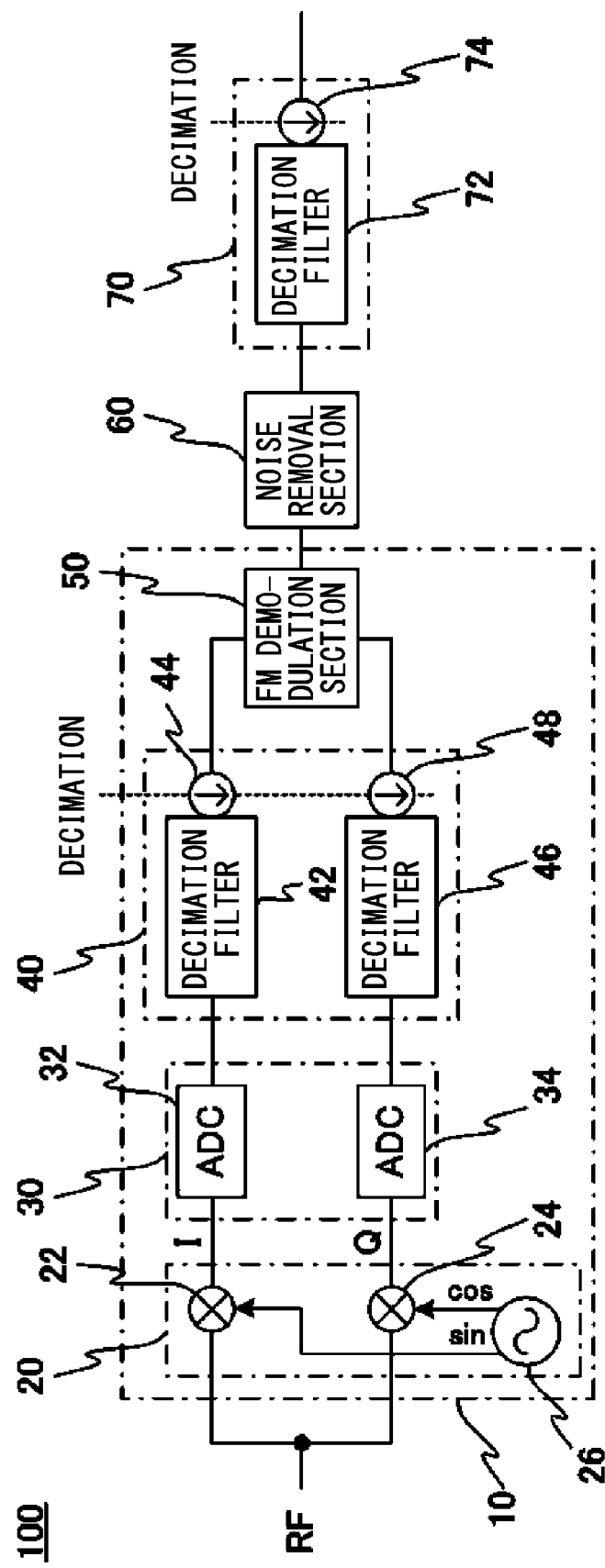
FIG. 1 shows a configuration of a demodulator according to the present embodiment.

FIG. 1 shows a configuration of a demodulator 100 according to the present embodiment. The demodulator 100 is an apparatus that receives a signal modulated to a radio wave and demodulates the received signal by arc-tangent wave detection. In the arc-tangent wave detection, the demodulator 100 normalizes a differential value of an arc-tangent value, for example, to fall within a range of $-\pi$ to $+\pi$. Here, when there are a lot of noises in a weak electric field, a differential value of an arc-tangent value may exceed the range described above due to an error of the arc-tangent values. Thus, the demodulator 100 normalizes a differential value of an arc-tangent value to fall within the range described above. For example, when a differential value of an arc-tangent value is $+1.1\pi$, the demodulator 100 normalizes the differential value to $-0.9\pi$. The demodulator 100 according to the present embodiment is designed to perform a suitable demodulation process in order to prevent erroneous demodulation due to normalization of a differential value of an arc-tangent value in this manner, thereby appropriately removing a noise from the received signal.

Note that in the present embodiment, it is assumed that the radio wave is FM modulated to $V_{FM}=C \sin(\omega_c t + m\int V_s dt)$ by changing a frequency of a carrier wave $V_c = C \sin(\omega_c t)$ in accordance with amplitude of a signal wave $V_s$. Here, $\omega_c = 2\pi f_c$ with a frequency of the carrier wave $f_c$, and m is a constant.

The demodulator 100 includes a demodulation section 10, a noise removal section 60, and a filter section 70.

The demodulation section 10 demodulates a signal that is modulated (modulated signal) in the received signal RF and outputs the demodulated signal. The demodulation section 10 includes an orthogonal demodulator 20, an AD conversion section 30, a filter section 40, and an FM demodulation section 50.

The orthogonal demodulator 20 receives the radio wave $V_{FM}$ through an antenna and demodulates the received signal RF that is received to an I signal and a Q signal which are orthogonal to each other. The orthogonal demodulator 20 includes a local transmitter 26 and mixers 22 and 24. The local transmitter 26 generates two orthogonal local signals $\cos(\omega_c t)$ and $\sin(\omega_c t)$ having a frequency $f_c$ and orthogonal to each other, and outputs the signals to the mixers 22 and 24, respectively. The mixer 22 mixes the received signal RF with the orthogonal signal $\sin(\omega_c t)$ (i.e., multiplication) to generate the I signal ($I = V_{FM} \sin(\omega_c t)$). The mixer 24 multiplies the received signal RF by the orthogonal signal $\cos(\omega_c t)$ to generate the Q signal ($Q = V_{FM} \cos(\omega_c t)$). The generated I and Q signals are output to the AD conversion section 30.

The AD conversion section 30 converts the I signal and the Q signal in an analog form to digital signals. The AD conversion section 30 includes AD converters (ADCs) 32 and 34.

The AD converters (ADCs) 32 and 34 are connected to the mixers 22 and 24 to convert the I signal and the Q signal input from the mixers 22 and 24 to digital signals, respectively. Sampling rates of the AD converters 32 and 34 are sufficiently higher than an output frequency of the demodulator 100, for example, twice or more to approximately 100 times. That is, the AD converters 32 and 34 over sample input signals. The converted I and Q signals are output to the filter section 40.

The filter section 40 reduces data rates of signals input thereto (i.e., down sampling). The filter section 40 includes two decimation filters 42 and 46 and two sampling frequency converters 44 and 48.

The decimation filters 42 and 46 receive the I signal and the Q signal from the AD converters 32 and 34, cut a portion of a high frequency band, and output the signals to the sampling frequency converters 44 and 48, respectively. A low-pass filter can be used as the decimation filters 42 and 46. A cutoff frequency can be determined in accordance with down sampling rates of the sampling frequency converters 44 and 48 as appropriate.

The sampling frequency converters 44 and 48 are connected to the decimation filters 42 and 46 to down sample the I and Q signals, input from the filters 42 and 46, of which portions of the high frequency band are cut, respectively. The down sampling rates of the sampling frequency converters 44 and 48 are, for example, one half or less.

The filter section 40 removes a carrier wave component from the I signal and the Q signal by down sampling the I signal and the Q signal, and outputs the signals only with a signal wave component to the FM demodulation section 50. Here, in down sampling by the filter section 40, the I signal and the Q signal are passed through the sampling frequency converters 44 and 48 via the decimation filters 42 and 46, respectively, which can prevent aliasing due to down sampling.

The FM demodulation section 50 is connected to the filter section 40 to demodulate the received signal RF using the I signal and the Q signal input from the filter section 40. The signals that are demodulated (demodulated signal) are output to the noise removal section 60. The detailed configuration of the FM demodulation section 50 is described below.

The noise removal section 60 is connected to the FM demodulation section 50 to process the demodulated signal input from the FM demodulation section 50 and remove a noise included in the signal. The demodulated signal from which a noise is removed is output to the filter section 70. The detailed configuration of the noise removal section 60 is described below.

The filter section 70 is connected to the noise removal section 60 to down sample the demodulated signal, input from the noise removal section 60, from which a noise is removed. The filter section 70 includes one decimation filter 72 and one sampling frequency converter 74.

The decimation filter 72 receives the demodulated signal from the noise removal section 60, cuts a portion of the high frequency band, and outputs the signal to the sampling frequency converter 74. A low-pass filter can be used as the decimation filter 72. A cutoff frequency can be determined in accordance with a down sampling rate of the sampling frequency converter 74 as appropriate.

The sampling frequency converter 74 is connected to the decimation filter 72 to down sample the demodulated signal, input from the filter 72, of which a portion of the high frequency band is cut. The down sampling rate of the sampling frequency converter 74 is, for example, one half or less.

Here, in down sampling by the filter section 70, the demodulated signals are passed through the sampling frequency converter 74 via the decimation filter 72, which can prevent aliasing due to down sampling.

Note that by using the filter sections 40 and 70 in combination, signals that are over sampled by the AD converters 32 and 34 are reduced to correspond to a determined sampling rate. Accordingly, the down sampling rates of the filter sections 40 and 70 are determined such that an inverse of the product thereof is equal to the sampling rates of the AD converters 32 and 34, respectively. For example, with respect to approximately 20 times the sampling rates of the AD converters 32 and 34, an inverse of the product of the respective down sampling rates of the filter sections 40 and 70 is approximately one twentieth. Accordingly, for example, when signals that are over sampled only by the filter section 40 are reduced to correspond to a determined sampling rate, the filter section 70 is not necessarily provided.

Figure 2:
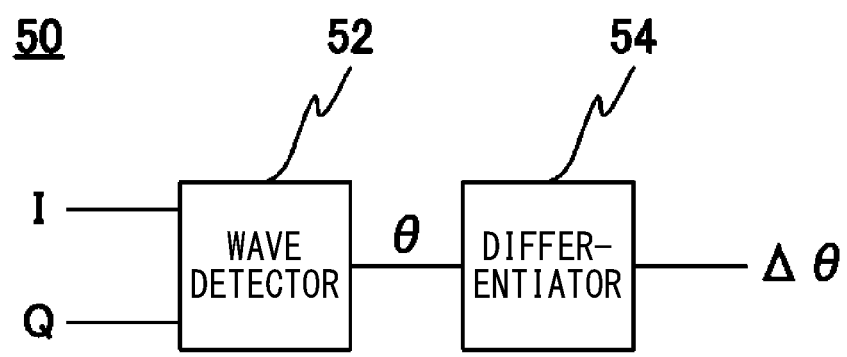
FIG. 2 shows a configuration of the demodulation section.

FIG. 2 shows the configuration of the FM demodulation section 50. The FM demodulation section 50 includes a wave detector 52 and a differentiator 54.

The wave detector 52 is a wave detector using an arc-tangent wave detection method and calculates an arc-tangent value $\theta = \tan^{-1}(Q/I)$ using the I signal and the Q signal input from the filter section 40. Here, the arc-tangent value $\theta$ is calculated to fall within a predetermined numerical range, for example, within a range of $2\pi$ from $-\pi$ to $+\pi$. The calculation result is output to the differentiator 54.

The differentiator 54 is connected to the wave detector 52 to calculate a differential value for the arc-tangent values input from the wave detector 52 with a time differential $\Delta\theta (=d\theta/dt)$ or a difference. Here, in accordance with the arc-tangent value $\theta$ calculated to fall within the predetermined numerical range in the wave detector 52, the differentiator 54 corrects the differential value of the arc-tangent value to fall within a predetermined numerical range, which is here the same range as the numerical range of the arc-tangent value $\theta$ (also referred to as normalization). The calculation result is output to the noise removal section 60 as the demodulated signal.

Figure 3:
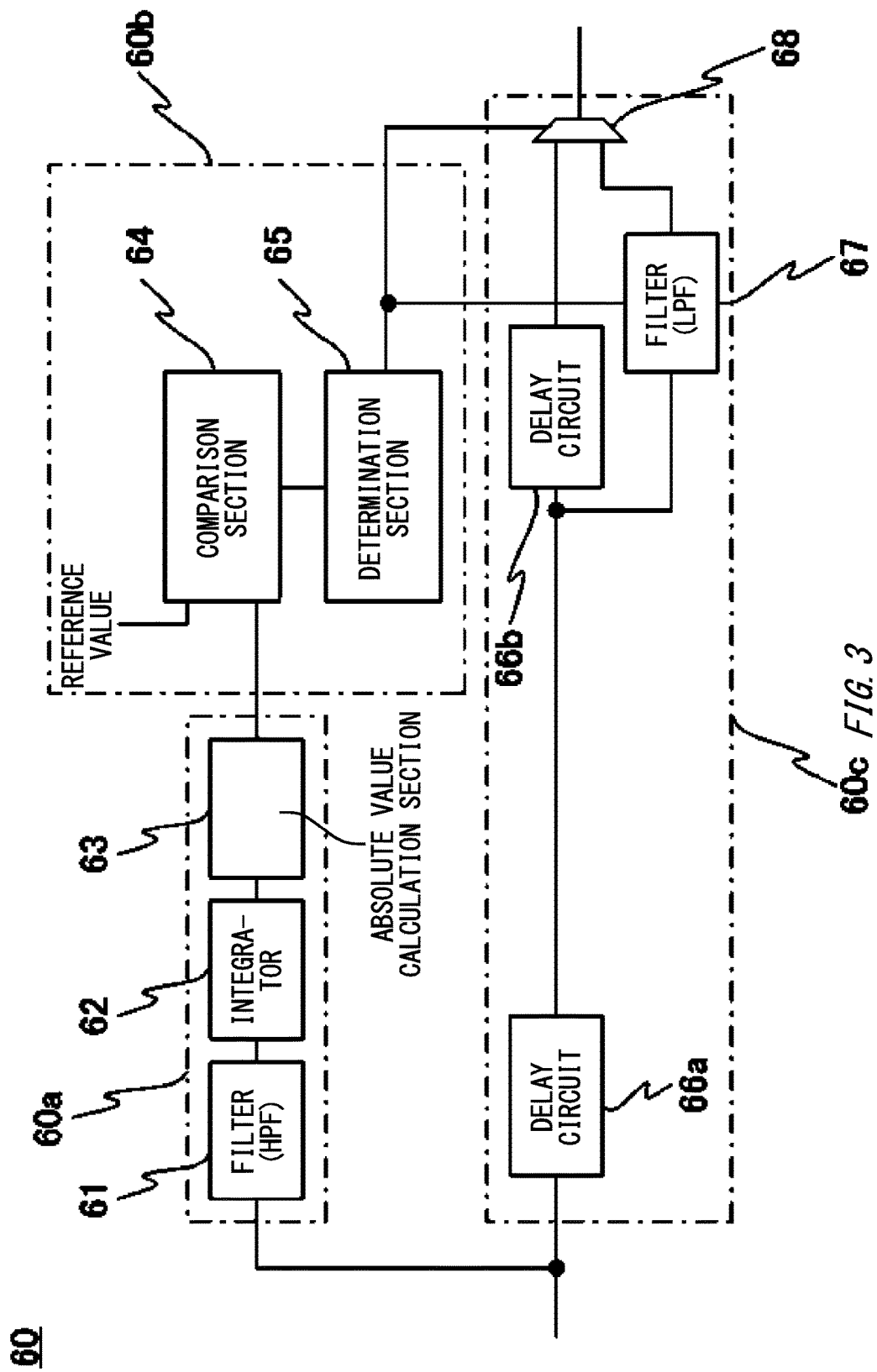
FIG. 3 shows a configuration of the noise removal section.

FIG. 3 shows the configuration of the noise removal section 60. In the present embodiment, a noise blanker is used as the noise removal section 60. The noise removal section 60 includes an integration section 60a, a zone detection section 60b, and a replacement section 60c.

The integration section 60a converts the demodulated signal into a form suitable for extracting erroneous demodulation due to normalization of the differential value of the arc-tangent value in the FM demodulation section 50. The integration section 60a is configured to include a filter 61, an integrator 62, and an absolute value calculation section 63.

The filter 61 receives the demodulated signal from the FM demodulation section 50, cuts an offset including a portion of the low frequency band, in particular a carrier wave component, and outputs the result to the integrator 62. A high-pass filter (HPF) can be used as the filter 61. A cutoff frequency can be determined in accordance with a carrier wave frequency as appropriate.

The integrator 62 is connected to the filter 61 to integrate signals input from the filter 61 and output the result (i.e., the integration result of the demodulated signals) to the absolute value calculation section 63. In the present embodiment, the integrator 62 integrates input signals over a predetermined zone (also referred to as partial integration or zone integration). A zone for partial integration can be determined to be a zone suitable for detecting erroneous demodulation or a pulse noise.

The absolute value calculation section 63 is connected to the integrator 62 to calculate an absolute value of an integration result of the demodulated signal input from the integrator 62 and output the result as an integrated signal to the zone detection section 60b. This allows erroneous demodulation to be detected, irrespective of whether the demodulated signal has a positive or negative value.

The zone detection section 60b detects a replacement target zone which is to be replaced in the demodulated signal (a so-called blanking zone) using the integrated signal. The zone detection section 60b includes a comparison section 64 and a determination section 65.

The comparison section 64 is connected to the integration section 60a to compare the integrated signal input from the integration section 60a with a reference value, and based on the result, detect a zone of a noise (referred to as a noise zone) included in the demodulated signal. Here, when the integrated signal is higher than the reference value, a logic high pulse is generated and output to the determination section 65 as a comparison result signal. Note that the reference value is to be determined as appropriate to a level to extract erroneous demodulation and remove a noise. For example, the reference value may also be determined to be larger than amplitude of a weak electric field noise to only extract erroneous demodulation and replace the demodulated signal.

The determination section 65 is a pulse stretcher which is connected to the comparison section 64 to stretch a time width of a pulse included in the comparison result signal input from the comparison section 64. This allows the determination section 65 to stretch the noise zone to determine a replacement target zone, and output it as a replacement target zone signal for indicating the replacement target zone, to a replacer 68 included in the replacement section 60c.

The replacement section 60c replaces a signal of the replacement target zone in the demodulated signal with a replacement target signal. The replacement section 60c includes delay circuits 66a and 66b, a filter 67, and the replacer 68.

The delay circuit 66a receives and delays the demodulated signal from the FM demodulation section 50, and outputs the signal to the delay circuit 66b (and the filter 67). The delay circuit 66b further delays the demodulated signal delayed by the delay circuit 66a and outputs the signal to the replacer 68. The demodulated signal is input to the replacer 68 by the delay circuits 66a and 66b, in accordance with a timing at which the replacement target zone signal is input to the replacer 68.

The filter 67 is connected to the delay circuit 66a to cut a portion of the high frequency band of the demodulated signal via the delay circuit and generate the replacement target signal, and outputs the signal to the replacer 68. A low-pass filter (LPF) can be used as the filter 67. This allows the filter 67 to generate the replacement target signal of which a noise of a spiked shape generated in the demodulated signal is cut. Here, a delay time of the delay circuit 66b is set equal to a delay time of the filter 67. This allows the filter 67 to input the replacement target signal to the replacer 68 in accordance with a timing at which the demodulated signal is input to the replacer 68 via the delay circuits 66a and 66b.

The replacer 68 replaces the demodulated signal input from the delay circuit 66b with the replacement target signal generated by the filter 67, when the replacement target zone signal input from the zone detection section 60b is a logic high, that is, when the replacement target zone signal indicates the replacement target zone.

Note that, in the noise removal section 60 described above, a noise is removed by replacing the demodulated signal with the replacement target signal generated by passing the demodulated signal through the filter 67. Alternatively, the noise removal section 60 may also replace the demodulated signal with a value of a blank signal or an input signal immediately before the replacement target zone. In such a case, the replacer 68 (and the filter 67) may be, for example, a D-type flip flop (not shown) which is triggered by the replacement target zone signal to hold the demodulated signal input via the delay circuit 66a.

Erroneous demodulation due to normalization of a differential value of an arc-tangent value is described in more detail.

Figure 4A:
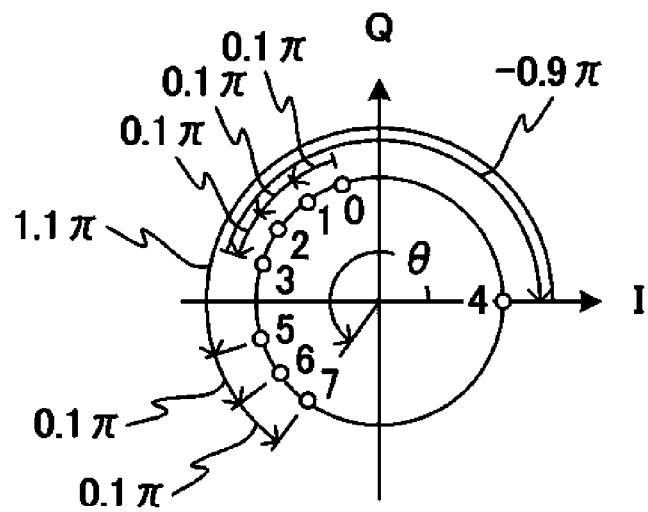
FIG. 4A shows one example of the arc-tangent values.

FIG. 4A shows one example of the arc-tangent values detected by the wave detector 52 of the FM demodulation section 50. In this example, the arc-tangent values θ are calculated to 0.6π, 0.7π, 0.8π, 0.9π, 0.0π, 1.1π, 1.2π, and 1.3π for eight samplings at clock times 0 to 7, respectively.

Figure 4B:
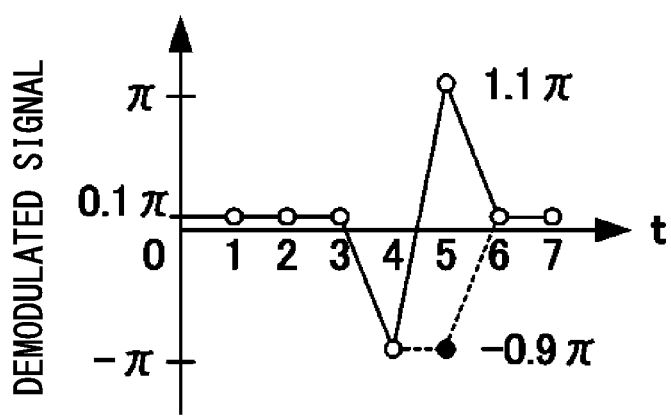
FIG. 4B shows one example of differential values calculated for the arc-tangent values of FIG. 4A and the demodulated signal calculated by normalizing the differential values.

FIG. 4B shows differential values (solid lines) calculated by the differentiator 54 for the arc-tangent values of FIG. 4A and the demodulated signal (dashed lines) output by normalizing the differential values. The differential values are calculated to 0.1π, 0.1π, 0.1π, −0.9π, 1.1π, 0.1π, and 0.1π for seven samplings at the clock times 1 to 7, respectively. That is, the differential values include noises of a spiked shape having negative and positive amplitude at the clock times 4 and 5, respectively. On the other hand, as the differential values are normalized to fall within a range of 2π from −π to +π, the demodulated signal is output to 0.1π, 0.1π, 0.1π, −0.9π, −0.9π, 0.1π, and 0.1π for the seven samplings, respectively. In this manner, normalization of the differential values of the arc-tangent values causes erroneous demodulation such that the differential value 1.1π at the clock time 5 is demodulated to −0.9π. The demodulated signal includes noises of a spiked shape having negative amplitude and erroneous demodulation at clock times 4 and 5, respectively, and the respective values are equal, which means that it includes a wide noise having negative amplitude from the clock time 4 through the clock time 5.

Figure 4C:
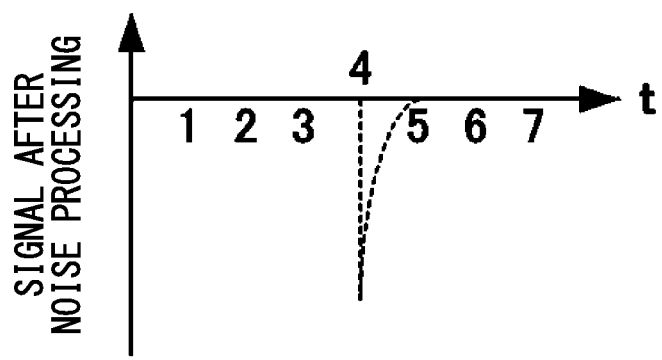
FIG. 4C shows one example of a signal obtained by filtering the demodulated signal of FIG. 4B.

FIG. 4C shows one example of a signal obtained by filtering the demodulated signal of FIG. 4B. If the differential values of the arc-tangent values are output as the demodulated signal in the FM demodulation section 50, without being normalized, the noises of a spiked shape generated at the clock times 4 and 5 in FIG. 4B have an averaged value not biased positively or negatively. Therefore, the noises are cut as pulse noises by passing the demodulated signal through the noise removal section 60, or cut as harmonic components by passing the demodulated signal through the decimation filter 72 included in the filter section 70. As a result, a noise-free signal is output (solid lines). On the other hand, if the differential values of the arc-tangent values are normalized, the signal value at the clock time 5 in FIG. 4B is −0.9π while its original signal value is 1.1π. Therefore, the signals are demodulated to have values largely biased negatively, even if the signal values are averaged. Accordingly, the demodulated signal is output without any portions being cut. Also, if the demodulated signal is passed through the decimation filter 72 included in the filter section 70, the signal with noises is output (dashed lines). That is because the signal having values largely biased negatively at the clock times 4 and 5 falls within the low frequency band, even if the values are averaged, and is not cut accordingly.

The principle of the noise processing by the noise removal section 60 is described. Here, an exemplary case is described in which the demodulated signal (and the differential value of the arc-tangent value) shown in FIG. 4B is input to the noise removal section 60 as an input signal.

Figure 5:
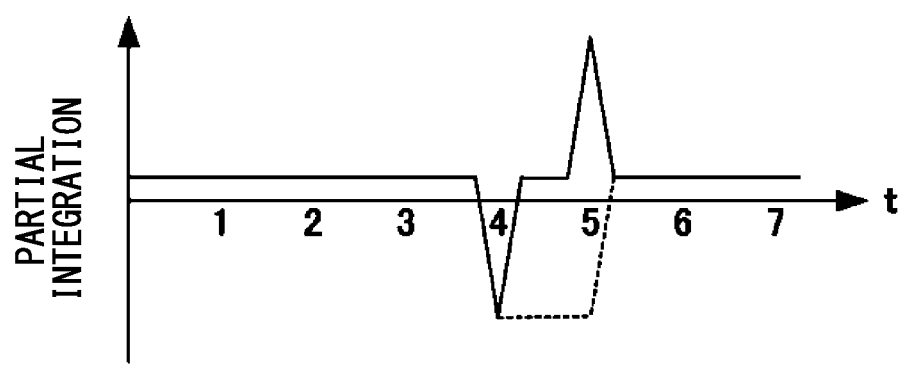
FIG. 5 schematically shows an output of the integration section included in the noise removal section.

FIG. 5 shows one example of an output (dashed lines) of the integrator 62. For reference, it also shows an output (solid lines) of the integrator 62 when the differential value of the arc-tangent value is input to the noise removal section 60 without being normalized. The demodulated signal passes through the high-pass filter included in the filter 61, prior to passing through the integrator 62, so that a signal component included in the demodulated signal which falls within the low frequency band is suppressed and a noise component which falls within the high frequency band is extracted. Signals from which the noise components are extracted are integrated by the integrator 62.

Due to a noise generated at the clock time 4 and erroneous demodulation generated at the clock time 5, outputs of the integrator 62 have large negative values at the clock times 4 and 5. Accordingly, erroneous demodulation can be detected by detecting an integral value having an absolute value larger than the reference value.

Figure 6A:
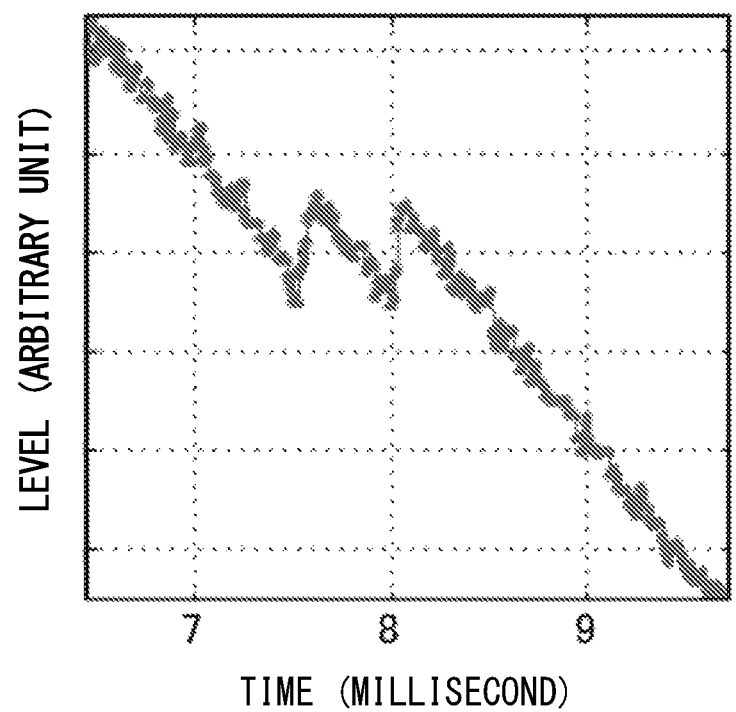
FIG. 6A shows one example of a demodulated signal including weak electric field noises.
Figure 6B:
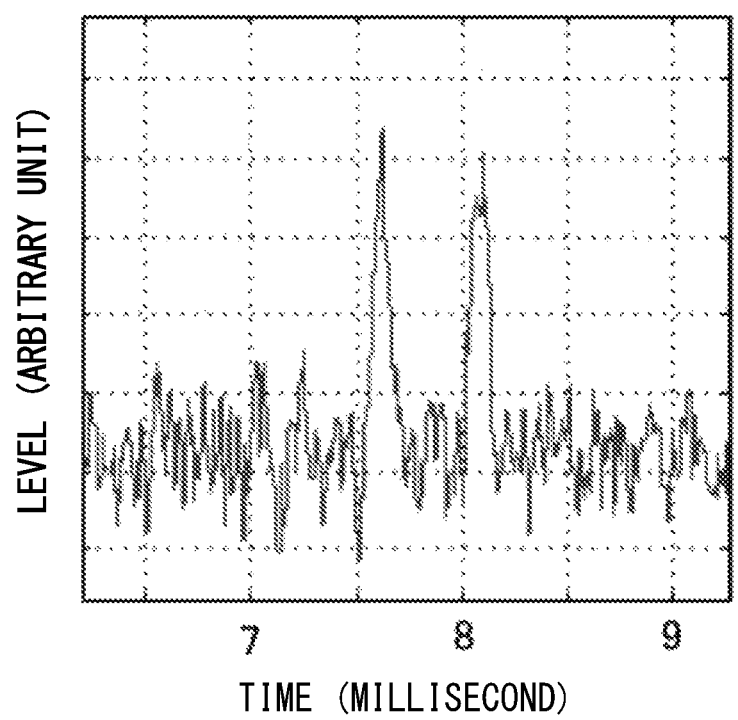
FIG. 6B shows one example of an output of the integration section when the demodulated signal of FIG. 6A is input into the noise removal section.

FIG. 6A and FIG. 6B each shows one example of actions of the integrator 62 (integration section 60a). Here, as one example, the demodulated signal including a weak electric field noise shown in FIG. 6A is to be input to the noise removal section 60. The demodulated signal is generally categorized into three components, that is, a carrier wave component monotonically decreasing over time, a component of a signal wave and a weak electric field noise fluctuating with minimal amplitude with respect to the carrier wave component, and a component of erroneous demodulation drastically rising at clock times of 7.5 and 8.1 milliseconds, respectively. Note that, for clarity of the component of erroneous demodulation in FIG. 6A, values of the carrier wave component are represented without being normalized to fall within a determined numerical range (range of 2π from −π to +π).

The demodulated signal of FIG. 6A is zone integrated by the integrator 62 so that the integrated signal shown in FIG. 6B is output. The integrated signal is generally categorized into three components, that is, a carrier wave component which is constant over time, a component of a signal wave and a weak electric field noise fluctuating with minimal amplitude with respect to the carrier wave component, and a component of erroneous demodulation which appears at clock times of 7.5 and 8.1 milliseconds, respectively. Here, two components of erroneous demodulation appear as spikes having large amplitude. Accordingly, by comparing, by the comparison section 64, the integrated signal from the integration section 60a with a reference value, erroneous demodulation can clearly be distinguished and detected from a signal wave and a weak electric field noise.

Note that, although the demodulator 100 according to the present embodiment is described as the one which demodulates a radio wave that is FM modulated, it is not limited thereto, but may also be a demodulator that demodulates a radio wave modulated by a modulation scheme such as FSK modulation, for example, which may cause erroneous demodulation due to normalization of a differential value of an arc-tangent value.

Note that, although the demodulator 100 according to the present embodiment is described to generate, by the orthogonal demodulator 20, the I signal and the Q signal from the received signal RF, and demodulates the signals by the wave detector 52 included in the FM demodulation section 50 using the arc-tangent wave detection method, alternatively, it may also use a Hilbert converter to pass the received signal RF through the Hilbert converter and then demodulates the signal by the wave detector 52.

While the embodiments of the present invention have been described, the technical scope of the invention is not limited to the above described embodiments. It is apparent to persons skilled in the art that various alterations and improvements can be added to the above-described embodiments. It is also apparent from the scope of the claims that the embodiments added with such alterations or improvements can be included in the technical scope of the invention.

The operations, procedures, steps, and stages of each process performed by an apparatus, system, program, and method shown in the claims, embodiments, or diagrams can be performed in any order as long as the order is not indicated by "prior to," "before," or the like and as long as the output from a previous process is not used in a later process. Even if the process flow is described using phrases such as "first" or "next" in the claims, embodiments, or diagrams, it does not necessarily mean that the process must be performed in this order.

As can be understood clearly from the description above, the demodulator can be realized according to an (one) embodiment of the present invention.

What is claimed is:

1. A demodulator comprising:
a filter configured to reduce a high frequency component of a downconverted signal downconverted from a modulated signal;
a demodulation section configured to output a demodulated signal demodulated from the downconverted signal, in which the high frequency component is reduced; and
a noise remover configured to reduce a noise in the demodulated signal demodulated from the downconverted signal by using:
an integration section configured to integrate the demodulated signal;
a zone detection section configured to detect a replacement target zone in the demodulated signal based on an integrated signal output by the integration section; and
a replacement section configured to replace a signal of the replacement target zone in the demodulated signal with a replacement target signal.

2. The demodulator according to claim 1, wherein the integration section includes a high-pass filter and is configured to integrate the demodulated signal passing through the high-pass filter.

3. The demodulator according to claim 1, wherein the integration section includes an absolute value calculation section configured to calculate an absolute value of a signal integrated from the demodulated signal.

4. The demodulator according to claim 1, further comprising a decimation filter configured to reduce a data rate of the demodulated signal passing through the replacement section.

5. The demodulator according to claim 1, wherein the zone detection section includes:
a comparison section configured to detect a noise zone of the demodulated signal based on a comparison result of the integrated signal with respect to a reference value; and
a determination section configured to stretch the noise zone and determine the replacement target zone.

6. The demodulator according to claim 1, wherein the replacement section includes a low-pass filter to which the demodulated signal is input and configured to output the replacement target signal.

7. The demodulator according to claim 1, wherein the demodulation section includes:
an orthogonal demodulator configured to demodulate, from the modulated signal that frequency modulated, an In-phase (I) signal and a Quadrature-phase (Q) signal orthogonal to each other; and
a frequency demodulator configured to output the demodulated signal obtained by differentiating an arc-tangent of the I signal and the Q signal.

8. The demodulator according to claim 7, wherein the frequency demodulator outputs the demodulated signal obtained by correcting a differential value of the arc-tangent of the I signal and the Q signal to fall within a predetermined numerical range.

9. The demodulator according to claim 1, wherein the replacement target zone is a zone in which a pulse noise at least exists, the pulse noise generated due to normalization of a differential value of an arc-tangent value.

10. A device comprising:
a filter configured to reduce a high frequency component of a downconverted signal downconverted from a modulated signal;
a frequency demodulator configured to output a demodulated signal demodulated from the downconverted signal, in which the high frequency component is reduced; and
a processor configured to reduce a noise in the demodulated signal demodulated from the downconverted signal by:
integrating the demodulated signal;
detecting a replacement target zone in the demodulated signal based on an integrated signal obtained by the integrating of the demodulated signal; and
replacing a signal of the replacement target zone in the demodulated signal with a replacement target signal.

11. A device comprising:
a filter configured to reduce a high frequency component of a downconverted signal downconverted from a modulated signal;
a frequency demodulator configured to output a demodulated signal demodulated from the downconverted signal, in which the high frequency component is reduced; and
a circuitry configured to reduce a noise in the demodulated signal demodulated from the downconverted signal by:
integrating the demodulated signal;
detecting a replacement target zone in the demodulated signal based on an integrated signal obtained by the integrating of the demodulated signal; and
replacing a signal of the replacement target zone in the demodulated signal with a replacement target signal.

* * * * *